United States Patent [19]
Gut et al.

[11] Patent Number: 5,546,271
[45] Date of Patent: Aug. 13, 1996

[54] DEVICE FOR ADJUSTING THE ANGLE OF A KEYBOARD

[75] Inventors: Bernhard Gut, Aichach; Franz Wandinger, München, both of Germany

[73] Assignee: Siemens Nixdorf Informationssysteme Aktiengesellschaft, Paderborn, Germany

[21] Appl. No.: 407,010
[22] PCT Filed: Sep. 16, 1993
[86] PCT No.: PCT/DE93/00872
§ 371 Date: Mar. 28, 1995
§ 102(e) Date: Mar. 28, 1995
[87] PCT Pub. No.: WO94/07701
PCT Pub. Date: Apr. 14, 1994

[30] Foreign Application Priority Data

Sep. 28, 1992 [DE] Germany ............... 42 32 483.1

[51] Int. Cl.⁶ ............... G06F 1/16; H05K 5/02
[52] U.S. Cl. ............... 361/680; 400/681; 400/682; 248/688
[58] Field of Search ............... 361/680; D14/100, D14/106, 114, 115; D18/7, 12; 312/208.1, 208.3, 208.4; 400/472, 681, 682, 691, 693; 248/688, 918

[56] References Cited

U.S. PATENT DOCUMENTS 4,658,124  4/1987  Bertina ............... 400/681
5,347,424  9/1994  Akahane ............... 361/680

FOREIGN PATENT DOCUMENTS 0216274  4/1987  European Pat. Off. .
3518026  9/1985  Germany .

OTHER PUBLICATIONS

*IBM Technical Disclosure Bulletin* vol. 24, No. 12, May 1982 "Keyboard–angle Adjustment", Kelley, T. F. et al.
*IBM Technical Disclosure Bulletin* vol. 25, No. 6, Nov. 1982 "Keyboard Tilt Mechanism".
*IBM Technical Disclosure Bulletin* vol. 26, No. 7A, Dec. 1983 "Dual Tilt Support Legs for Keypad", Allen, D.
*Japanese Patent Abstract*, vol. 8, No. 170, Aug. 7, 1984 "Spring Type Turning Gear".
*Japanese Patent Abstract* vol. 8 No. 179, Aug. 17, 1984 "Keyboard", Watanabe.
*IBM Technical Disclosure Bulletin* vol. 28, No. 6, Nov. 1985 "Keyboard Support Lifting Assembly with Locking Feature".

Primary Examiner—Leo P. Picard
Assistant Examiner—Lynn D. Hendrickson
Attorney, Agent, or Firm—Hill, Steadman & Simpson

[57] ABSTRACT

An adjustable keyboard support device is provided having a tubular bearing element (1), secured to a housing bottom (5) of a keyboard. A generally L-shaped stand (2) is provided with two bearing pins (3, 4) which fit respectively into tube ends of the bearing element. The stand includes two U-brackets (6, 7) placed perpendicularly to one another. The two jointly pivotable U-brackets (6, 7) of different lengths. A locking element (8) extends from one of the U-brackets, engaging in the bearing element (1) for fixing the position in one of the two inclination angle settings.

10 Claims, 1 Drawing Sheet

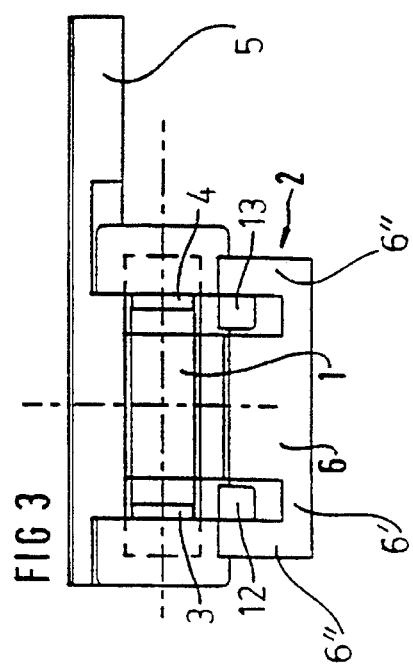
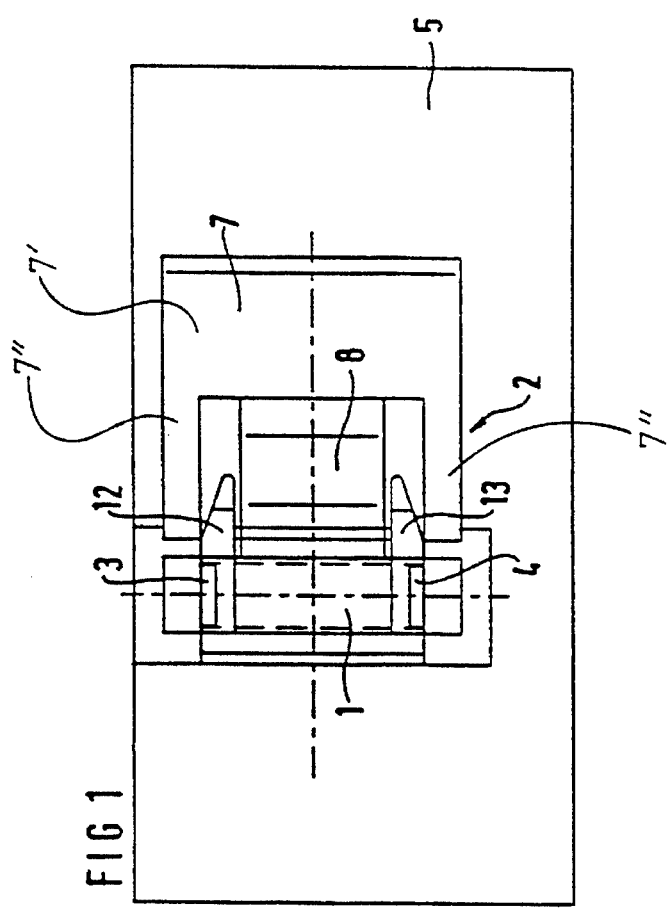
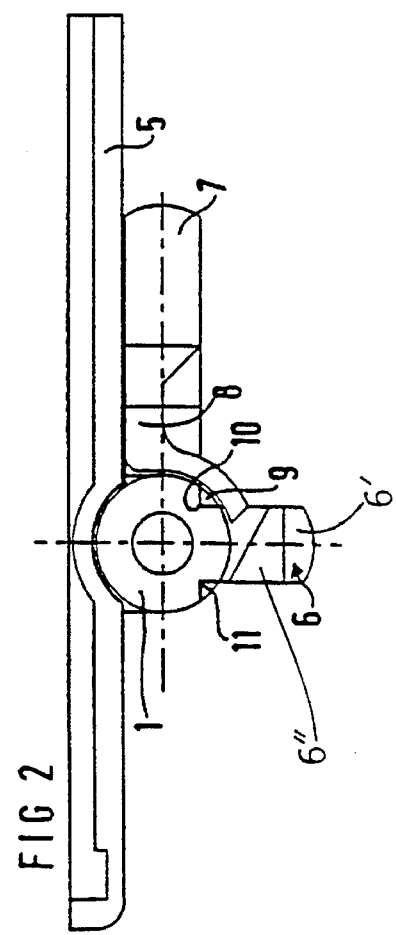

5,546,271

DEVICE FOR ADJUSTING THE ANGLE OF A KEYBOARD

BACKGROUND OF THE INVENTION

The present invention generally relates to computer keyboard support members. More specifically, the present invention relates to support members which are adjustable to support the keyboard at a selected angle.

Keyboards for computers should meet ergonomic requirements in terms of operator comfort. This is particularly important when keyboards are actuated over relatively long periods of time as is the case in data processing units. The ergonomically desirable designs of keyboards demand adjustability of the keyboard's inclination with respect to a horizontal work surface in order to accommodate the bodily comfort of different operators and the dimensions of different work spaces.

For example, EP-B 0 216 274 and "IBM Technical Disclosure Bulletin, Vol. 26, No. 7A, December 1983, pages 3277–3278" disclose devices for adjusting the inclination angle of keyboard housings. In each of these devices, bearing elements provided for fastening the pivotable stands to the keyboard are constructed in a relatively complex manner. Consequently, a considerable additional outlay in terms of construction and production is necessary for a keyboard housing which includes such bearing elements.

SUMMARY OF THE INVENTION

The present invention is now based on the object of constructing a device for the adjustment of the inclination angle of keyboard housings in such a manner that constructive interventions into the form of the housing are not necessary.

The present invention achieves this object by providing a device for the variable adjustment of the inclination angle of a keyboard housing supported on a flat surface. The device includes a tubular bearing element which has two opposite, open ends. The tubular bearing element is secured to the housing bottom proximal to a rear corner of the housing. The device also includes a stand which has two U-brackets of different lengths. The U-brackets are arranged at an angle from each other so that the stand is generally L-shaped. The U-brackets meet at a pair of inwardly-directed bearing pins. Each bearing pin rotatably resides in a respective end of the tubular bearing element, thereby securing the stand to the bearing element. The stand further has a locking element which extends from at least one of the U-brackets. The locking element engages in the bearing element to adjustably retain the housing in one of at least two inclination angle settings.

In an embodiment, each U-bracket includes a strip-shaped web and a pair of U-legs. Each U-leg extends from a respective end of the web at a generally right angle thereto.

In an embodiment, a tongue, running parallel to the U-legs, has one end which is secured to one of the U-brackets. The tongue has an opposite preend from which the locking element extends to engage the bearing element in a locking manner.

In an embodiment, two groove like locking notches are provided on an outer surface of the tubular bearing element. Each notch runs parallel to an axis of the tubular bearing element.

In an embodiment, the tongue is shaped to follow the contour of the outer surface of the bearing element, having the shape of a circular arc. The locking element is disposed on an inner surface of the circular arc.

In an embodiment, a pair of inclined surfaces are disposed on the keyboard housing running transversely to an axis of the tubular bearing element, each incline surface being disposed respectively adjacent one of the two ends of the tubular bearing element. Along the incline surfaces, the bearing pins respectively slide during assembly while slightly spreading the U-brackets and finally dip, or snap into the respective tube ends.

Also in an embodiment, a device is provided for supporting a keyboard housing on a surface at an angle. Device includes a tubular bearing element secured to a bottom of the housing, the tubular bearing element having two ends. The device also includes a stand having a short bracket member and a long bracket member. The bracket members extend at generally a right angle from each other. The stand further includes a pair of inwardly-facing pins which reside within the ends of the tubular bearing element to rotationally secure the stand relative to the housing. The stand is rotatably adjustable between a first incline setting and a second incline setting. In the first incline setting, the short bracket member is disposed generally perpendicularly to the housing, and in the second incline setting the long bracket member is disposed generally perpendicularly to the housing.

In an embodiment, a resilient tongue extends from the stand, the tongue having a locking element thereon. At least two grooves are disposed in the tubular member within which the locking element engages to retain the stand in a selected one of the incline settings.

In an embodiment, each bracket is U-shaped. Each bracket has a pair of parallel U-legs extending from respective ends of a horizontal web at right angles thereto. U-legs at respective sides of each bracket are joined together, at which joining points the pins extend respectively inward.

It is, therefore, an advantage of the present invention to provide support members for a keyboard housing which can adjust to at least two incline positions.

Another advantage of the present invention is to provide a keyboard support device which can be adjusted by simply rotatably moving the stand member which snaps into a selected position.

A further advantage of the present invention is to provide a keyboard support device which can be easily assembled, the stand simply sliding along the incline surfaces, spreading the pins apart, until the pins snap into the tubular bearing member.

Yet another advantage of the present invention is to provide a keyboard support device which has relatively few parts.

Additional features and advantages of the present invention are described in, and will be apparent from, the detailed description of the presently preferred embodiments and from the drawings.

BRIEF DESCRIPTION OF THE DRAWINGS

FIG. 1 illustrates a partial bottom plan view of the keyboard housing and device.

FIG. 2 illustrates a side elevation of the keyboard and device of FIG. 1.

FIG. 3, illustrates a front elevation of the keyboard and device of FIGS. 1 and 2.

DETAILED DESCRIPTION OF THE PRESENTLY PREFERRED EMBODIMENTS

The device shown in FIGS. 1 to 3 for adjusting the inclination angle of a keyboard housing consists of two parts, a bearing element 1 and a stand 2 pivotably fastened on the bearing element 1. The bearing element 1 consists of a tubular body, on the two open ends of which in each case one bearing pin 3, 4 of the stand 2 dips in and is guided. The tubular bearing element 1 is arranged on and secured to the bottom surface of the lower part of the keyboard housing 5 and possibly embedded in a flat groove which is shaped in the form of an arc of a circle. The stand 2 which is pivotably fastened to the bearing element by means of two inwardly directed bearing pins 3, 4. The stand 2 is formed as a single piece, including a short U-bracket 6 and a long U-bracket 7 which are joined together generally at a right angle from each other. The stand 2 can be selectively pivoted to and secured in either a first or second inclination angle setting wherein either the short U-bracket 6 (as shown) or long U-bracket 7 is directed perpendicularly downward from the keyboard housing 5.

Each U-bracket 6, 7 is generally U-shaped. The U-bracket 6 has a straight, horizontal web 6' from which a pair of U-legs 6" extend from opposite ends at right angles to the web 6'. Similarly, the U-bracket 7 has a straight, horizontal web 7' from which a pair of U-legs 7" extend from opposite ends at right angles thereto. When respectively secured in a downwardly directed position, the horizontal 6' or 7' can support the keyboard on a flat surface.

The U-brackets 6 and 7 are joined together generally in an L-shape, the respective U-legs 6" and 7" being joined together at opposite ends of the stand 2, generally at the pins 3, 4.

The longer of the two U-brackets 7 preferably has a tongue 8 extending from the horizontal web, the tongue having free end which engages in a locking manner in the bearing element 1. For this purpose, the free tongue end, which nestles against a lateral surface of the bearing element 1 as circular arc, has on the surface facing the bearing element 1 a locking element 9 in the form of a wedge-shaped transverse web, which locking element engages, depending on the position of the stand 2, into one of two locking notches 10, 11 mutually offset by 90° degrees. To facilitate the assembly of the stand 2 on the bearing element 1, inclined surfaces 12, 13, running transversely to the tube axis, are provided on the two ends of the tubular bearing element 1, along the inclined surfaces, the bearing pins 3, 4 of the stand 2 slide during the assembly while slightly spreading the U-brackets 6, 7 until the pins 3, 4 snap respectively into the two tube ends.

It should be understood that various changes and modifications to the presently preferred embodiments will be apparent to those skilled in the art. Such changes and modifications may be made without changing the spirit and scope of the present invention, and without diminishing its attendant advantages. It is, therefore, intended that such changes and modifications be covered by the appended claims.

What is claimed is:

1. A device for the variable adjustment of the inclination angle of a keyboard housing supported on a flat surface, the device comprising:

a tubular bearing element having two opposite, open ends, the tubular bearing element being secured to the housing bottom proximal to a rear corner of said housing; and a stand having two U-brackets of different lengths, the U-brackets being arranged at an angle from each other so that the stand is generally L-shaped, the U-brackets meeting at a pair of inwardly-directed bearing pins, each bearing pin rotatably residing in a respective end of said tubular bearing element, securing the stand to the bearing element, the stand further having a locking element extending from at least one of said U-brackets, the locking element engaging in the bearing element to adjustably retain the housing in one of at least two inclination angle settings.

2. The device according to claim 1, wherein each U-bracket comprises:

a strip-shaped web; and a pair of U-legs, each U-leg extending from a respective end of said web at a right angle, thereto so that each U-bracket is generally U-shaped.

3. The device according to claim 1 further comprising:

a tongue having one end secured to one of the U-brackets, the tongue having an opposite free end from which said locking element extends to engage the bearing element in a locking manner.

4. The device according to claim 3, further comprising:

at least two groove-like locking notches, are provided on an outer surface of the tubular bearing element, each notch running parallel to an axis of the tubular bearing element.

5. The device according to claim 3 wherein the free end of the tongue is shaped to follow the contour of the outer surface of the bearing element, having the shape of a circular arc, and wherein the locking element is disposed on an inner surface of the circular arc.

6. The device according to claim 1 further comprising:

a pair of inclined surfaces of the keyboard housing running transversely to an axis of the tubular bearing element, each inclined surface being disposed respectively adjacent one of the two ends of the tubular bearing element (1), along which inclined surfaces the bearing pins of the stand slide during the assembly while slightly spreading the U-brackets and so that the pins snap into the respective tube ends.

7. A device for supporting a keyboard housing on a surface at an angle, the device comprising:

a tubular bearing element secured to a bottom of said housing, the tubular bearing element having two ends;

a stand having a short bracket member and a long bracket member, the bracket members extending at generally a right angle from each other, the stand including a pair of inwardly-facing pins which reside within said ends of the tubular bearing elements to rotationally secure said stand relative to said housing;

wherein said stand is rotatably adjustable between a first incline setting such that said short bracket member is disposed generally perpendicularly to said housing and a second incline setting such that said long bracket member is disposed generally perpendicularly to said housing.

8. The device according to claim 7 further comprising:

a resilient tongue extending from said stand, said tongue having a locking element thereon; and at least two notches disposed in said tubular member within which said locking element engages, each notch being associated with one of said incline settings for retaining said stand in a selected one of said incline settings.

9. The device according to claim 7 wherein each bracket is U-shaped, each bracket having a pair of parallel U-legs extending from respective ends of a horizontal web at right angles, respective U-legs of each bracket being joined proximal to said pins.

10. The device according to claim 7 further comprising:
a pair of incline surfaces, each said inclined surface being arranged adjacent one of said tube ends for spreading said pins during assembly of 'said device.

\* \* \* \* \*